H. O. AMES.

Evaporating Pan.

No. 24,978.

Patented Aug. 9, 1859.

Witnesses:

Jnt McIntyre
Alfred S Cowhnd

Inventor:

H O Ames

UNITED STATES PATENT OFFICE.

H. O. AMES, OF NEW ORLEANS, LOUISIANA.

IMPROVEMENT IN APPARATUS FOR HEATING EVAPORATING-PANS.

Specification forming part of Letters Patent No. 24,978, dated August 9, 1859.

*To all whom it may concern:*

Be it known that I, H. O. AMES, of New Orleans, in the parish of Orleans and State of Louisiana, have invented a new and Improved Arrangement of Steam-Pipes for Evaporating-Pans; and I do hereby declare that the following is a full, clear, and exact description of the same, reference being had to the accompanying drawings, forming part of this specification, in which—

Figure 1:
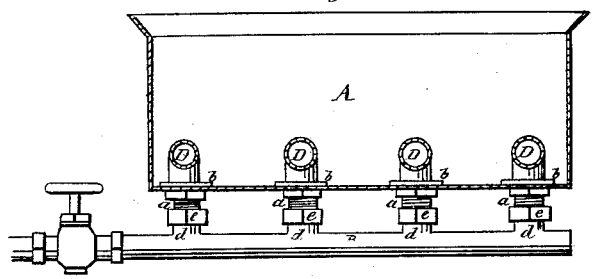
Figure 2:
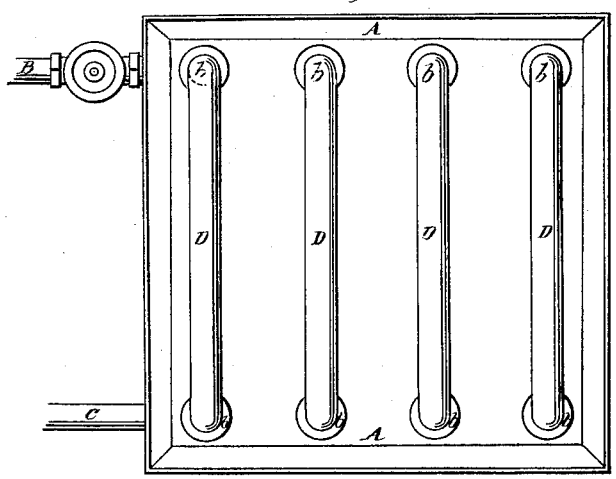
Figure 3:
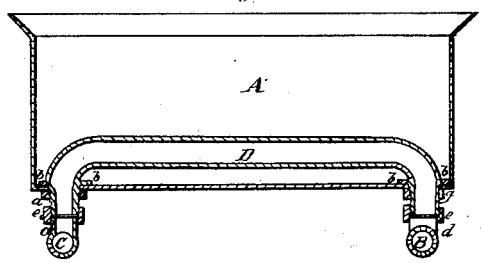

Figures 1 and 2 are vertical sections, at right angles to each other, of a sugar-pan with my improved arrangement of pipes applied. Fig. 3 is a plan of the same.

Similar letters of reference indicate corresponding parts in the several figures.

My invention consists in a certain arrangement of the evaporating, supply, and escape steam pipes and their connections, whereby provision is made for heating all parts of the pan to a uniform or very nearly uniform temperature, the collection of the water of condensation to any extent in the evaporating-pipes is effectually prevented, all the connections of the pipes are brought outside of the pan, and provision is made for the repairs of the pipes and for the removal of such of the evaporating-pipes as may be necessary for repair or other purpose without rendering it necessary to stop the operation till they are replaced.

To enable others skilled in the art to make and use my invention, I will proceed to describe its construction and operation.

A is the pan.

B is the supply-steam pipe, and C the escape-pipe, arranged parallel with each other under the pan near and parallel with opposite ends or sides thereof.

D D are the evaporating-pipes, made straight, but with an elbow at each end, and with screwed nozzles *a a* on the said elbows to pass through holes provided for them in the bottom, above the steam and escape pipes, and with collars *b b* above the screwed nozzles. These pipes D D are arranged at right angles to the steam and escape pipes, and are secured in their places by nuts *c c*, fitted to the nozzles *a a* below the pan. Gaskets are to be placed under the collars *b b* to make tight joints. Each evaporating-pipe is connected with the steam-pipe B at one end and with the escape-pipe C at the other, by means of nozzles *d d* on the steam and escape pipe and union-couplings *e e*, connecting the said nozzles with the screw-nozzles *a a*. The evaporating-pipes should have a slight downward inclination toward the escape-pipe, that the water of condensation may pass off freely.

To set the pan in operation, steam is admitted to the pipe B by opening the cock provided in said pipe for the purpose, and from this pipe it passes through the several evaporating-pipes D D, where it is for the most part condensed, and whence the water of condensation and steam not condensed pass into the escape-pipe C. The evaporating-pipes being at equal distances apart, all parts of the pan are uniformly heated, and owing to the short distance the water of condensation has to travel to reach the escape-pipe it cannot collect in any considerable quantity in the bottoms of the evaporating-pipes, as it does in coils or any system of pipes which pass circuitously through the pan, and thus render ineffective a large portion of the surface of the pipe.

Either evaporating-pipe D can be removed separately for repair, and as the connections *e e* are outside the pan either of said pipes is permitted to be uncoupled while the pan is in operation by temporarily shutting off the steam. After placing stoppers in the nozzles *d d* belonging to the disconnected pipe the steam may be turned on again. On account of the convenience afforded in the above respect my arrangement of the pipes and connections is superior to any which I have ever known.

I do not claim carrying the pipes through the bottom of the pan; but

What I claim as my invention, and desire to secure by Letters Patent, is—

The arrangement of the parallel evaporating-pipes D D, with their elbows and collars, and screw-nozzles *a a*, passing through the bottom of the pan, and the parallel external supply and escape pipes, B and C, with the nozzles *d d*, and union-couplings *e e*, for the connections with the nozzles *a a*, substantially as herein described.

H. O. AMES.

Witnesses:
   JNO. MCINTYRE,
   ALFRED S. COWAND.